March 20, 1928.
B. R. BENJAMIN
1,663,236
PLANTER ATTACHMENT FOR TRACTORS
Filed July 30, 1926
2 Sheets-Sheet 1
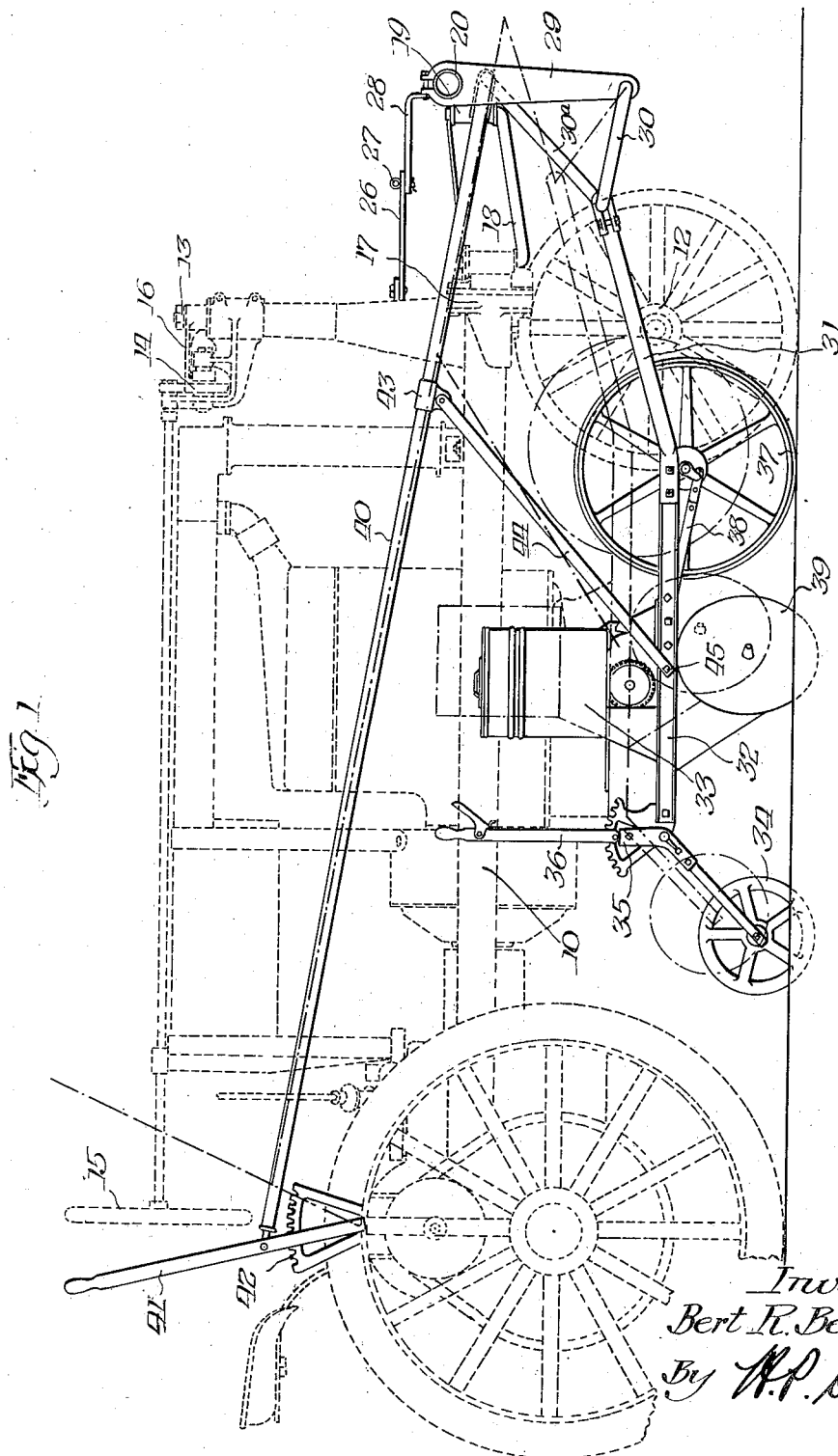
Inventor:
Bert R. Benjamin
By W.P. Davies
Atty.

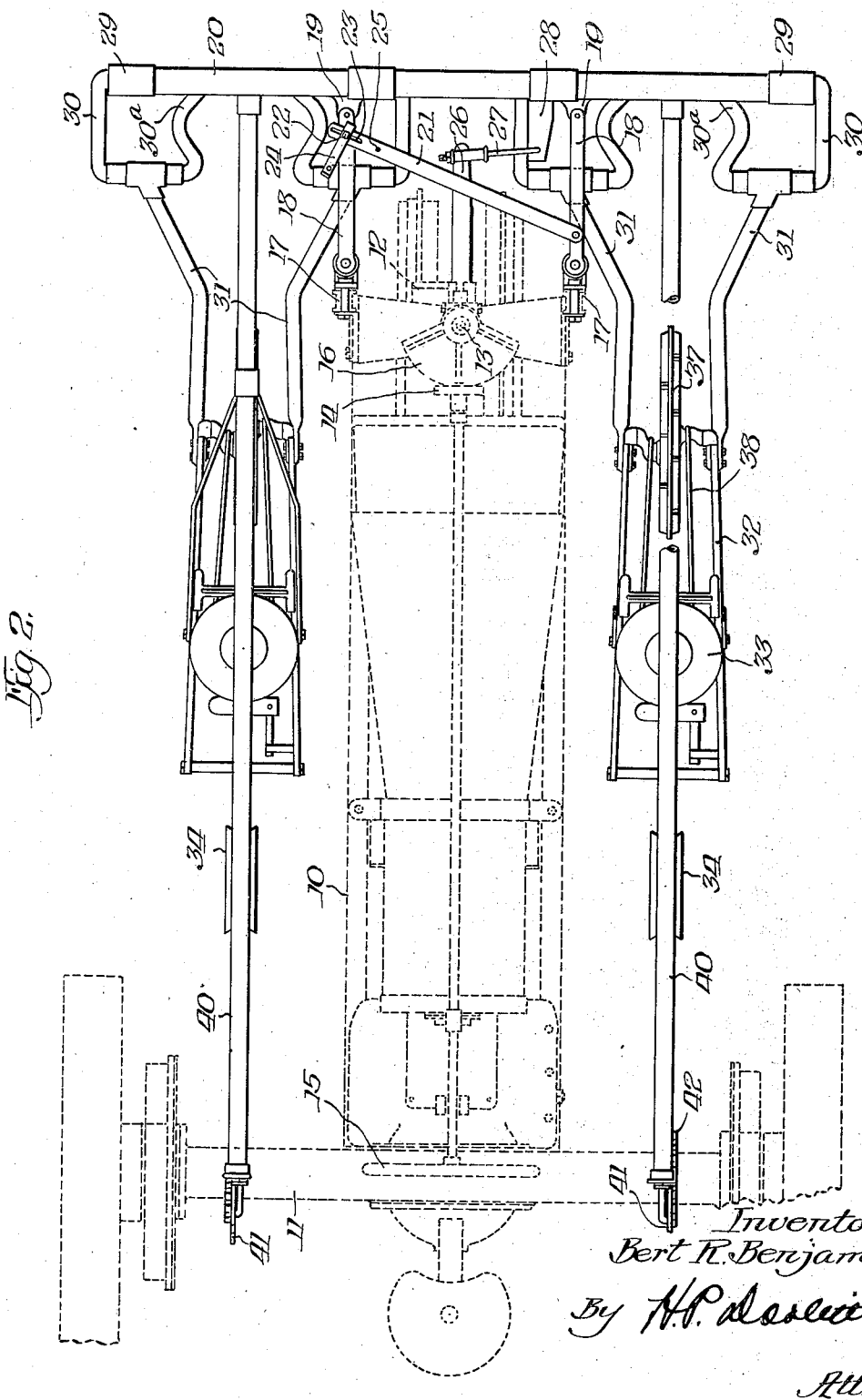

Patented Mar. 20, 1928.

1,663,236

UNITED STATES PATENT OFFICE.

BERT R. BENJAMIN, OF OAK PARK, ILLINOIS, ASSIGNOR TO INTERNATIONAL HARVESTER COMPANY, A CORPORATION OF NEW JERSEY.

PLANTER ATTACHMENT FOR TRACTORS.

Application filed July 30, 1926. Serial No. 125,855.

This invention relates to farm implements and is directed more particularly to implements of the class adapted for attachment to and operation in conjunction with tractors.

The principal object of the invention is to provide means for converting farm tractors into efficient tractor planters when desired and to produce a tractor planter structure in which the planter units will be positioned at each side of the forward portion of the tractor body where they will be conveniently positioned for observation and control by the operator of the tractor.

A further object is to provide a structure that will be easily attachable to existing types of tractors and that will provide the desired arrangement of planter units and also will include means for governing the operation of the planting elements when the structure is in position on a tractor.

The foregoing and other minor objects have been attained by the provision of a structure having for its characteristic features of construction a transverse frame member attachable at its center to the front end of a tractor frame in a manner to provide for lateral adjustment or movement, if desired, and having its ends projecting laterally well beyond the sides of the tractor body, the projecting ends carrying planter units in such manner as to provide for lifting and lowering movement thereof, and the connecting means between the planter units, transverse frame bar and tractor body including actuating means for the lifting and lowering mechanism which governs the operation of the planter units and which is controllable from a station on the tractor body.

The invention accordingly resides in the organization and details of construction, or equivalents thereof, hereinafter more particularly described, and then defined in the claims.

Referring to the drawings,—

Figure 1 is a side elevation of the invention as applied to a common type of tractor; and Figure 2 is a similar plan view.

In the present instance the invention is illustrated as including a tractor of a type having a comparatively narrow longitudinal body frame 10 supported on rear axle structure 11 including widely spaced traction wheels adapted to span two plant rows. The forward end of the body 10 is supported on a single centrally positioned steering truck 12. These parts are shown in dotted lines on the drawings. The steering truck includes an upright steering post 13 journaled in a front cross member on the tractor frame, and the truck is steered through gearing 14 which transmits movement of the steering wheel and rod 15 to a gear sector 16 on the upper end of the standard of the steering truck.

On the forward corners of the tractor frame at each side of the steering post suitable supporting brackets 17 are provided. These brackets cooperate with coupling elements carrying pivotally mounted forwardly extending supporting arms 18. These arms extend horizontally and at their forward ends are pivoted in clamp brackets 19 supporting a transversely extending frame member 20 which projects laterally beyond each side of the tractor a sufficient distance to extend over at least one plant row at either side of the body frame of the tractor. The pair of arms 18 and frame member 20, just described, provide a support which may be moved laterally with respect to the tractor body. The extent of such lateral movement is limited by a slotted rod 21 connecting one of the arms 18 with a pin 22 on the other. The pin 22 engages a slot 23 in the rod 21 and is provided with a pivoted latch 24 which may be swung into alignment with bar 21 and carries a pin on its under side adapted to engage in an opening 25 in bar 21, thereby locking the arms 18 and member 20 against lateral movement when desired. As one preferred means for shifting the member 20 during operation of the implement, if that is desired, there is provided a forwardly projecting arm 26 which is connected to the vertical standard of the steering truck and shares its movement. The outer end of this arm is connected as by a link 27 to an arm 28 on one of the clamp brackets 19. By this arrangement, steering movement of the truck will be communicated to the member 20 to shift it in the direction of steering movement, which movement is limited by the length of the slot 23 in arm 21. The supporting and shifting mechanism for the frame bar 20, above described, may be of substantially the construction disclosed in the patent to Benjamin et al., No. 1,539,108, May 26, 1925, where the structure is described in detail.

In the embodiment of the invention herein disclosed, the transverse frame member 20 carries a pair of fixed depending members 29 on each of its projecting ends, which pairs of members are arranged to straddle adjacent plant rows, which in this instance are also straddled by the rear traction wheels of the tractor on which the planter attachment is mounted. Each pair of depending arms 29 carries an arched crank member 30 which has horizontally extending angular portions pivoted in the lower ends of the arms 29 and an upwardly extending forwardly inclined arched portion, the upper portion 30ᵃ of which may swing in the space between the arms. The angular portions of the arch members 30 include transversely extending portions forming bearings for dragbars 31, the rear ends of which are fixed to frames 32 carrying planter units. These units are shown in this instance as comprising the usual seed hopper and dispensing mechanism 33 mounted at the center of the frame 32, which frame is supported at its rear on adjustable covering wheels 34 journaled in brackets 35, which are pivotally connected to the frame 32 and adjustable in the usual manner by means of the lever 36. The forward end of the frame 32 at its point of connection with the dragbars 31 is supported on a wheel 37, and this wheel may be connected to the dispensing mechanism by a double crank and pitman construction 38 of well known type. Each planter unit is also provided with the necessary furrow openers herein shown as twin disks 39. As means for lifting and lowering each planting unit and thereby governing its operation, there is provided a lift operating rod 40, the forward end of which is pivotally connected to the arched portion 30ᵃ of the arched members 30. The rear end of this rod 40 is connected to a lever 41 which is pivoted on a bracket 42 provided with a locking rack for lever 41 and having means for connecting it to the rear axle structure of a tractor. At a proper point in its forward portion the operating rod 40 carries a bracket 43 to which is pivoted the upper end of a lifting yoke 44, the arms of which are pivotally connected at 45 to the sides of the planter frame 32. With this arrangement, when the lever 41 is swung, the rod 40 will be given longitudinal movement and the arched members 30 given arcuate movement, the range of which is indicated in dotted lines on Figure 1, thereby causing up and down movements of the lifting yoke 44 and planter unit in a substantially parallel manner, as also indicated in dotted lines on Figure 1.

It will be evident that the construction described results in a simple structure for providing a tractor of standard type with planting units positioned at its sides where they are under observation of the operator at his station on the rear of the tractor and that the attachment through the operating rods 40 and levers 41 provides means whereby the units can be raised and lowered to bring them out of or into operating position. It will also be clear that the frame member 20 may be allowed to have lateral movement, if desired, and that this movement will be transmitted through the steering mechanism, thereby causing the planter units to share in the steering movement of the tractor. It will be understood, however, that member 20 may be locked against lateral movement and the arm 26 disconnected from the steering standard 13 in which case the steering of the tractor will not affect the planter units.

While the construction above described exemplifies one preferred form of the invention, it will be obvious to those skilled in the art that certain modifications in the structure are possible without departing from the scope of the invention as defined in the following claims.

What is claimed as new is:

1. The combination of a self-propelled vehicle having a longitudinal body frame, traction and steering means supporting opposite ends of the frame, a carrying member extending across the front end of the body frame and projecting beyond it at each side, planter units positioned to trail at each side of the body frame and each having ground wheels normally supporting the unit, draft connections including means carried by the projecting ends of the carrying member for bodily lifting and lowering the planter units while maintaining said units in parallel relation to the ground surface, and means operable from a station on the vehicle for actuating the lifting and lowering means.

2. The combination comprising a self-propelled vehicle having a longitudinal body frame, traction and steering means supporting the opposite ends of the frame, planter units positioned to trail at each side of the body frame and each having ground wheels normally supporting the unit, draft connections carried by the forward portion of the body frame and connected thereto by laterally shiftable means including means for bodily lifting and lowering the planter units, and actuating means for the lifting and lowering means and for the laterally shiftable carrying means operable from a station on the vehicle.

3. The combination of a self-propelled vehicle comprising a rear axle housing having an operator's station thereon and supported at its ends on traction wheels and a body frame extending centrally from said housing and supported on a steering truck, planter units located on each side of the body frame in advance of the axle, said units having horizontal frames having supporting wheels at the front and rear, means connecting each planter unit to the body frame including vertically shiftable draft members connected to each unit at longitudinally spaced points on the frame, and means operable from the operator's station for shifting said supports to bodily raise and lower the planter units while maintaining the frames in parallel relation to the ground surface.

4. The combination of a self-propelled vehicle comprising a rear axle housing having an operator's station thereon and supported at its ends on traction wheels and a body frame extending centrally from said housing and supported on a steering truck, planter units located on each side of the body frame and truck and in advance of the axle within the treads of the traction wheels, supporting wheels individual to each planter unit, means for actuating the units from certain of said wheels, combined draft and lifting means connecting each unit to the body frame, and means operable from the operator's station for actuating the lifting means.

In testimony whereof I affix my signature.

BERT R. BENJAMIN.